United States Patent [19]

Hawley

[11] 4,439,387
[45] Mar. 27, 1984

[54] METHOD OF MANUFACTURING A COMPOSITE REINFORCING STRUCTURE

[75] Inventor: Ronald C. Hawley, Winona, Minn.

[73] Assignee: Polymer Composites, Inc., Winona, Minn.

[21] Appl. No.: 321,375

[22] Filed: Nov. 16, 1981

Related U.S. Application Data

[62] Division of Ser. No. 75,116, Sep. 13, 1979, Pat. No. 4,312,917.

[51] Int. Cl.³ .............................................. B29F 3/10
[52] U.S. Cl. ................................... 264/108; 264/136; 264/174; 425/112; 425/114
[58] Field of Search ...................... 264/174, 136, 108; 425/114, 112

[56] References Cited

U.S. PATENT DOCUMENTS

| 1,700,208 | 1/1929 | Paisseau | 264/108 |
|---|---|---|---|
| 2,625,498 | 1/1953 | Koch | 264/136 |
| 2,643,207 | 6/1953 | Entwistle | 264/136 |
| 2,877,501 | 3/1959 | Bradt | 264/136 |
| 2,989,778 | 6/1961 | Frenkel | 425/114 |
| 3,146,508 | 9/1964 | Berliner et al. | 425/114 |
| 3,405,426 | 10/1968 | Donald | 425/114 |
| 3,508,990 | 4/1970 | Marzocchi | 156/166 |
| 3,635,879 | 1/1972 | Baer et al. | 264/136 |
| 3,742,106 | 6/1973 | Price | 264/134 |
| 3,787,352 | 1/1974 | Marzocchi et al. | 264/136 |
| 3,856,447 | 12/1974 | Schiesser | 425/114 |
| 3,940,464 | 2/1976 | Davis | 264/136 |
| 3,999,914 | 12/1976 | Breher et al. | 425/114 |
| 4,038,018 | 7/1977 | Pepmeier | 425/112 |
| 4,243,713 | 1/1981 | Worrall | 428/245 |

FOREIGN PATENT DOCUMENTS 52-7019  2/1977  Japan .................................. 425/114

Primary Examiner—Jeffery R. Thurlow
Attorney, Agent, or Firm—Williamson, Bains, Moore & Hansen

[57] ABSTRACT

A compound composite structure is a combination of plastics and other materials forming a structure usable in the fabrication of manufactured products or components. A compound composite structure is composed of a thermoplastic resin material bonded to, by mixture with, a composite reinforcing structure. The composite reinforcing structure consists of fibers imbedded in a thermoplastic resin material. The composite reinforcing structure may be formed by passing extruded plastic resin material through a die which imbeds fibers. The compound composite structure may be formed by mounting a preformed composite reinforcing structure in a molding die and by injecting thermoplastic resin material into the molding die.

2 Claims, 4 Drawing Figures

U.S. Patent     Mar. 27, 1984     4,439,387
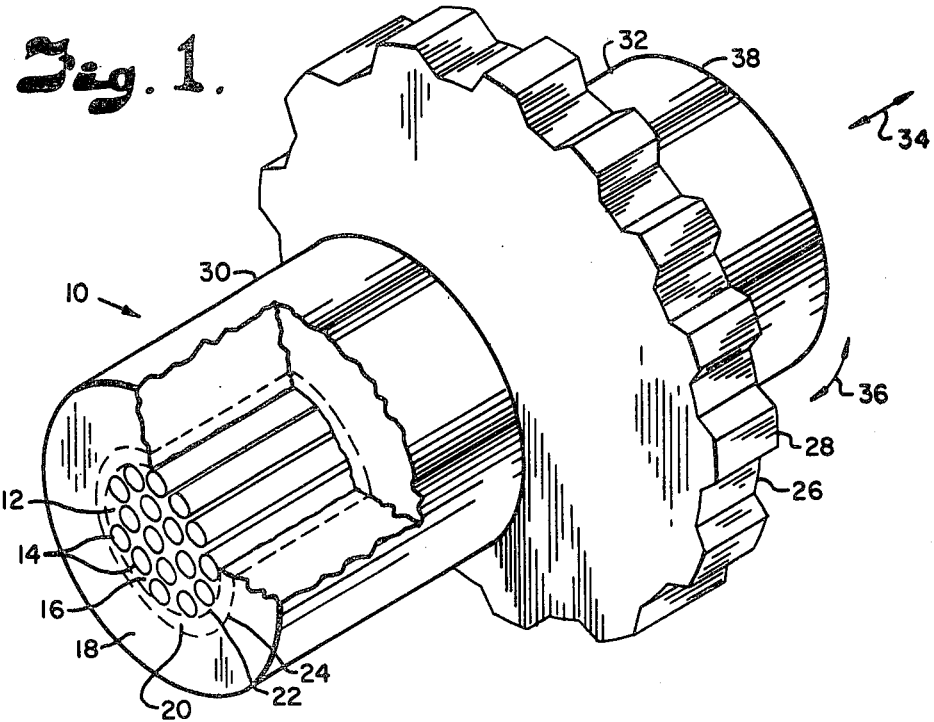
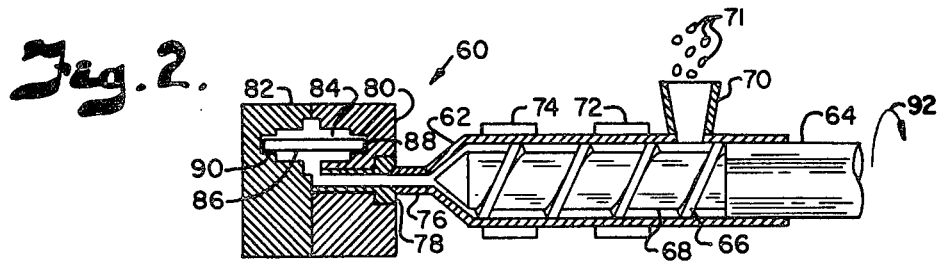
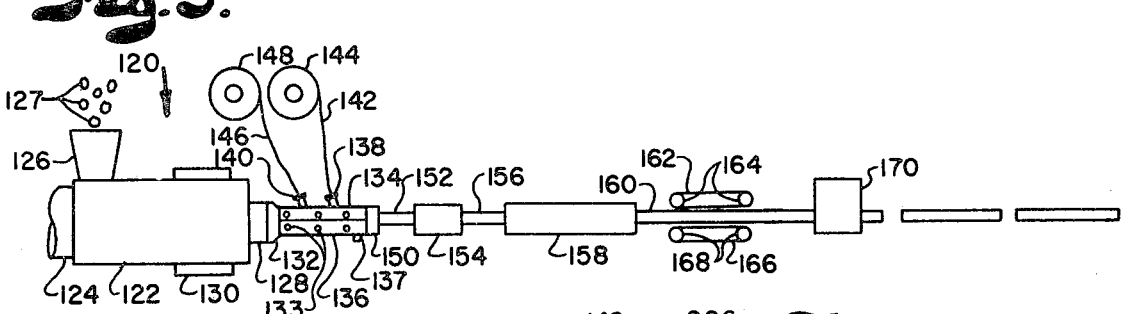
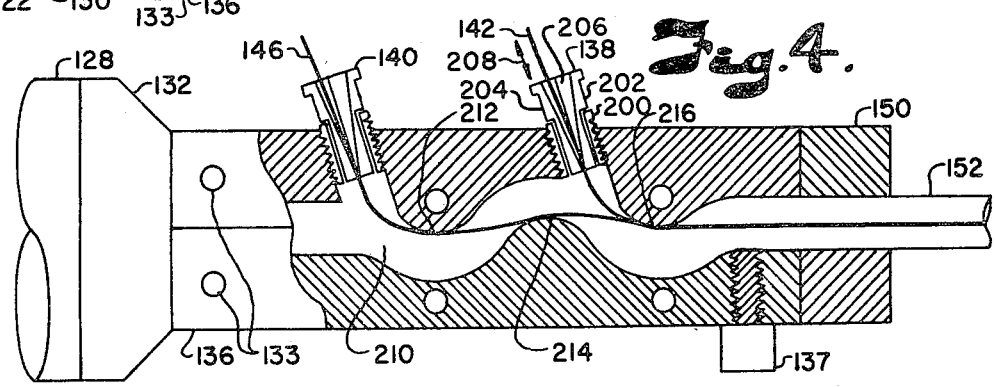

METHOD OF MANUFACTURING A COMPOSITE REINFORCING STRUCTURE

This is a division of application Ser. No. 75,116, filed Sept. 13, 1979, now U.S. Pat. No. 4,312,917 issued Jan. 26, 1982.

BACKGROUND OF THE INVENTION

This invention relates generally to reinforced thermoplastic structures and methods of manufacturing such structures. This invention pertains particularly to compound composite structures in which thermoplastic resin material is bonded to a preformed composite reinforcing structure composed of fibers imbedded in thermoplastic resin material.

A method for producing solid rods by combining resin-impregnated, longitudinally extending, parallel strands or roving of fibers to form both the solid body or core of the rod as well as the outer layer of material consisting of the longitudinally extending, parallel fibers imbedded in plastic is disclosed by Leonard S. Meyer in U.S. Pat. No. 3,470,051. The Meyer patent mentions a method of applying an outer layer of parallel roving to the exterior of a prefabricated solid core. However, Meyer does not show a thermoplastic resin material bonded to a composite reinforcing structure. Meyer relies on a process of coating fiber strands with resin and later hardening the resin so that the fibers will be imbedded in the resin in longitudinally extending, exactly parallel relationship. Meyer discloses the use of an extrusion die which acts to guide resin covered fibers and combine them into a rod-like mass.

A method for encapsulating fibers in a collimated array within a thermoplastic resin matrix is disclosed by Baer et al in U.S. Pat. No. 3,635,879. The Baer process uses chopped glass strands in the preparation of capsules which may be used as feed stock for an extruder or molding apparatus. In U.S. Pat. No. 3,834,980, Hall discloses a method of extruding a coating of thermoplastic polymer over roving formed from fibrous strands. The Hall process is used to form pellets which may later be blended with thermoplastic and used in a molding process. A method of manufacturing plastic rods having fiber strands extending continuously throughout the length of the rod is shown by Koch in U.S. Pat. No. 2,625,498. The Koch method submerges a bundle of strands into a bath of thermosetting resin and then heats the bundle in a mold until the resin has completely set or cured. A granule consisting of lengths of glass roving coated with a molding plastic is described by Bradt in U.S. Pat. No. 2,877,501. The Bradt capsules are intended for use as a feed stock for an injection molding machine.

The prior art patents mentioned above do recognize the value of using fiber strands to reinforce plastics. However, the prior art does not show a method of adequately reinforcing thermoplastic resin to allow the manufacture of satisfactory parts and components. Particularly, the prior art does not show a satisfactory method of imbedding aligned fibers inside intricate part shapes. A satisfactory method of employing thermoplastic resins in the production of high strength plastic parts is not shown by the prior art. Also, the prior art does not show a simple method of imbedding continuous length fiber strands in a thermoplastic resin material using an extruder.

BRIEF SUMMARY OF THE INVENTION

Accordingly, it is an object of this invention to provide a compound composite structure usable in the fabrication of manufactured products or components.

Another object of this invention is to provide a method of bonding thermoplastic resin material to a preformed composite reinforcing structure. It is desirable to have a molding method which allows the fabrication of high strength, precisely formed products or components.

A further object of this invention is to provide a method for forming a composite reinforcing structure by imbedding fibers in extruded thermoplastic resin material. It is desirable to employ such a method in which commercially standard extruders are utilized without substantial modification to produce the composite reinforcing structure.

Another object of this invention is to provide a method for precisely locating and orienting a composite reinforcing structure inside a compound composite structure. A precise method of locating and orienting a reinforcing structure allows the efficient use of materials such that only the highly stressed parts of a product or component need be reinforced. By precisely locating and orienting reinforcing structures, materials may be saved and the directional sensitivity of some types of reinforcing structures may be exploited to provide strength in products or components where needed.

Still another object of the invention is to provide a method of manufacturing parts and components using a compound composite structure which allows fabrication at a high rate of speed.

Another object of this invention is to provide a compound composite structure that is temperature resistant and which will not warp or fracture when subjected to temperature changes.

Another object of this invention is to provide a composite reinforcing structure which may be heated and reshaped to fit as an insert in a molding die so that products or components having irregular directional strength requirements may be formed as compound composite structures.

Briefly, this invention involves a compound composite structure formed by bonding a thermoplastic resin material to a composite reinforcing structure. A composite reinforcing structure may be formed by imbedding long fibers in a first thermoplastic resin material. The composite reinforcing structure is then used as insert in an injection molding machine die so that a second thermoplastic resin material may be molded around the composite reinforcing structure. The first and second thermoplastic resin materials should be compatible so that when the second thermoplastic resin material is injected into the molding die, at least a thin layer of the first thermoplastic resin material is melted and becomes intermixed with the second thermoplastic resin material. Thus, the second thermoplastic resin material becomes bonded to the composite reinforcing structure in a zone of mixture between the first and second thermoplastic resin material.

These and other objects and advantages of my invention will appear more fully from the following description made in conjunction with the accompanying drawings wherein like reference characters refer to the same or similar parts throughout the several views.

BRIEF DESCRIPTION OF THE DRAWINGS

FIG. 1 shows a partially cut away perspective view of a compound composite structure.

FIG. 2 shows a partly cut away side view of an injection molding machine and mold die for production of compound composite structures.

FIG. 3 shows a side view of an apparatus for extruding composite reinforcing structures.

FIG. 4 is a partly cut away side view of an extrusion die for producing composite reinforcing structures.

DESCRIPTION OF THE PREFERRED EMBODIMENT

FIG. 1 shows a compound composite structure which is designated generally by the number 10. The compound composite structure shown has a surface shape in the form of teeth 28 cut in a gear wheel 26 mounted on an axle 38. A bearing (not shown) may be mounted on surface 30, and another bearing (not shown) may be mounted on surface 32. Alternatively, separate bearing structures may be omitted and surfaces 30 and 32 may themselves be used as bearing surfaces mounted in suitably shaped bores (not shown) to form a sleeve-type bearing. Thus the particular compound composite structure 10 shown is a gear assembly which may be rotated about axis 34 of axle 38 in the direction shown by arrow 36. However, my invention may be used in products or components having many different shapes. The particular shape shown in FIG. 1 is presented for illustrative purposes only, and indicate only one possible shape a compound composite structure 10 may take.

The compound composite structure 10 consists of a second thermoplastic resin material 18 bonded to a composite reinforcing structure 12. The composite reinforcing structure 12 of FIG. 1 is shown as a long solid circular cylindrical rod. However, composite reinforcing structure 12 may have many different cross sectional geometric shapes including such shapes as a square, rectangle, triangle, "I" shape, or "[" shape. Also, composite reinforcing structure 12 may have an elongated tubular shape with a hollow center. Such elongated tubular shapes for composite reinforcing structure 12 may have any of various cross sectional geometries including circular, triangular, or rectangular.

The composite reinforcing structure 12 consists of fibers 14 imbedded in a first thermoplastic resin material 16. The second thermoplastic resin material 18 is bonded to the composite reinforcing structure 12 in a zone of mixture 20 where the first thermoplastic resin material 16 is mixed with the second thermoplastic resin material 18. While the boundaries of a zone of mixture 20 may not be clearly defined in a compound composite structure 10 because of the nature of the first thermoplastic resin material 16 and the second thermoplastic resin material 18, at least some mixture does exist in a zone of mixture 20 shown bounded by first dotted line 22 and second dotted line 24 of FIG. 1.

Thermoplastic resin materials 16 and 18 may be any of various types of thermoplastics, but material 16 need not be the same type of thermoplastic as material 18. A partial list of types of thermoplastics usable as material 16 or 18 would be: polypropylene, polyethylene, various nylons, polycarbonate, styrene, styrene acrylonitrile, acrylonitrile butadiene styrene, polysulfone, various polyesters, polyurethane, polyphenylene sulfide, DuPont Hytrel brand polyester elastomer, and various thermoplastic rubbers. The second thermoplastic resin material 18 may consist of an acetal resin or other self lubricating or low friction type resin so that surfaces 30 and 32 may themselves be used as bearing surfaces.

Fibers 14 are shown in FIG. 1 as a collection of long, substantially straight, substantially parallel strands aligned in the direction parallel to axis 34 of axle 38. This arrangement of fibers 14 substantially strengthens the axle 38 in a direction parallel to axis 34. The presence of fibers 14 causes compound composite structure 10 to have anisotropic mechanical properties and to have an increased strength, stiffness, flexural modulus, or tensile modulus. Fibers 14 may be composed of any of many different types of materials including such types as: glass, carbon, graphite, DuPont Kevlar brand aramid fibers, various ceramics, and various metals. My compound composite structure may also be formed using a collection of fibers 14 which are randomly oriented, woven or twisted together. The volumetric amount of fibes 14 relative to the volumetric amount of first thermoplastic resin material 16 present in the composite reinforcing structure 12 is not a fixed proportion. Enough resin material 16 should be present to thoroughly cover each of the fibers 14 so that fibers 14 are embedded in the material 16. The volumetric proportion between fibers 14 and material 16 may be adjusted and optimized for the particular product or component to be manufactured as a compound composite structure 10. It is expected that increasing the proportion between the volume of fibers 14 and the volume of material 16 will increase the strength and other mechanical properties of the compound composite structure 10.

For best performance, the temperature coefficient of expansion for the second thermoplastic resin material 18 should be the same as that for the first thermoplastic resin material 16. As the temperature is increased or decreased, the first thermoplastic resin material 16 and the second thermoplastic resin material 18 can be expected to expand or contract. If the materials 16 and 18 expand different amounts when the temperature is changed, the compound composite structure 10 may fracture, become warped, or undergo some other kind of structural damage. A temperature coefficient of expansion is a measure of the amount of expansion a material undergoes when exposed to changes in temperature. Matching the temperature coefficient of expansion for the materials 16 and 18 will result in a compound composite structure 10 which is less likely to be damaged by changes in temperature.

The thermoplastic resin materials 16 and 18 may be augmented by ingredients added to improved performance or reduce cost. Fillers may be added to material 16 or 18 to extend the volume of the material 16 or 18 and thus reduce cost by replacing thermoplastic with less expensive fillers. Such fillers may include various types of minerals such as talc. Reinforcement substances such as short lengths of glass, carbon or graphite fiber may be added to material 16 or 18 to change the mechanical properties of the material 16 or 18, such as increase the mechanical strength or elastic modulus. Stabilizers may be added to material 16 or 18 to prevent the change of material 16 or 18 when exposed to environmental stimuli. Such stabilizers may prevent burning of material 16 or 18 when exposed to flame or may prevent chemical changes in material 16 or 18 when exposed to sunlight. Bonding additives may be added to material 16 or 18 to improve the amount of mixing and bonding between material 16 and material 18. Such bonding additives as silane may be used to improve compatability between material 16 and material 18 such that material 18 readily mixes with material 16.

A compound composite structure 10 may also be formed which has more than one composite reinforcing structure 12. A structure 10 may have more than one reinforcing structure 12 to provide increased strength in more than one direction. Thus a designer may position a plurality of reinforcing structure 12 inside a compound composite structure 10 to reinforce the highly stressed areas of compound composite structure 10. The use of a plurality of composite reinforcing structures 12 would be particularly advantageous in the construction of products or components formed as compound composite structures 10 having a shape subject to a plurality of localized stress concentrations.

FIG. 2 shows a commercially standard injection molding machine which has been denoted generally by the number 60. The injection molding machine 60 has a screw shaft 64 mounted inside a barrel 62. Threads 66 are mounted on screw shaft 64 and define a chamber 68 having a helical shape inside the barrel 62. Hopper 70 is mounted on barrel 62 and allows feedstock 71 to be dropped into chamber 68. As screw shaft 64 is rotated in direction 92, feedstock 71 is conveyed from hopper 70 to nozzle 76 of barrel 62. Feedstock 71 is heated by frictional forces resulting when screw shaft 64 is rotated and is also heated by heater 72 and heater 74. Heater 72 and heater 74 are preferably electrical resistance heaters mounted on the barrel 62.

Sprue plug 78 is mounted in right mold half 80 and abuts against nozzle 76. Right mold half 80 is placed next to left mold half 82 so as to define a cavity 84. Right mold half 80 has a right insert support 88 which is preferably a cylindrical bore with a flat bottom. Similarly, left mold half 82 has a left insert support 90 which is preferably a cylindrical bore with a flat bottom. Insert 86 is preferably a cylindrical rod and is placed inside cavity 84 and is mounted between right insert support 88 and left insert support 90.

In practice, a preformed composite reinforcing structure (see structure 12 of FIG. 1) is used as an insert 86 and is placed between right mold half 80 and left mold half 82. The position of insert 86 is stabilized by support 88 and support 90. When insert 86 is in place, a thermoplastic resin material (see material 18 of FIG. 1) is used as a feedstock 71 and is placed in hopper 70. Screw shaft 64 is then rotated in direction 92 to cause the feedstock 71 to move along barrel 62 and be heated by frictional forces and by heaters 72 and 74. The heated feedstock 71 passes through nozzle 76 and is injected into sprue plug 78. The heated feedstock 71 passes from sprue plug 78 and completely fills cavity 84. The feedstock 71 has a temperature sufficient to cause the feedstock 71 to bond to the composite reinforcing structure insert 86. Bonding is best achieved when at least a thin layer of insert 86 is caused to melt by the heated feedstock 71. When a portion of insert 86 melts, the feedstock 71 mixes with the melted portion of insert 86 and a strong bond results between insert 86 and the feedstock 71. After the materials inside cavity 84 are allowed to cool, right mold half 80 is separated from left mold half 82 and the finished part is removed from inside cavity 84.

As described above, a plurality of composite reinforcing structures (see structure 12 of FIG. 1) may be used to construct compound composite structures. Such a plurality of composite reinforcing structures would be provided by additional inserts similar to insert 86. Also, additional inserts could be mounted in additional supports similar to supports 88 and 90.

Although insert 86 is shown in FIG. 2 as a solid cylindrical rod, insert 86 may have any geometric shape and may be constructed as a hollow tube. Insert 86 is a composite reinforcing structure (see structure 12 of FIG. 1) and it is preferable that insert 86 be formable when heated. That is, it is preferable to have an insert 86 which can be formed to a desired shape before insert 86 is mounted between the mold halves 80 and 82. Users of my process of manufacturing compound composite structures need keep on hand heat deformable composite reinforcing structures of only a few standard shapes. Products or components formed as a compound composite structure requiring an insert 86 having an irregular shape may be manufactured by a process including a step of forming a composite reinforcing structure having a standard shape into the insert 86 having the desired shape. To be heat deformable, insert 86 should preferably comprise a thermoplastic resin material which yields plastically at elevated temperatures without cracking, crazing or undergoing chemical changes.

The apparatus shown in FIG. 2 and the method described above may be used to mold compound composite structures having both a high strength and a precisely controlled shape. The method described above utilizes thermoplastics which are molded into shape using heat. The molding process produces a product having a very precisely controlled shape. The use of a reinforced insert produces a product having a greater strength or elastic modulus. The molding process can be utilized to manufacture products at a high rate of speed.

FIG. 3 shows an apparatus for the production of composite reinforcing structures and includes a commercially standard extruder machine designated generally by the number 120. The extruder machine 120 has a screw shaft 124 mounted inside a barrel 122. Hopper 126 allows feedstock 127 to be passed inside barrel 122. Heater 130 is preferably an electrical resistance heater mounted outside barrel 122. The feedstock 127 passes through barrel 122, is heated by heater 130, exits through barrel flange 128, and enters die flange 132. Upper die half 134 mates with lower die half 136. Die halves 134 and 136 are mounted between flange 132 and forming die 150. Heaters 133 are a plurality of heating elements mounted in upper die half 134 or lower die half 136. Heaters 133 are preferably electrical resistance heaters formed in the shape of elongated cylindrical rods. Pressure sensor 137 is shown mounted in lower die half 136 near forming die 150.

In use, a first thermoplastic resin material is dropped into hopper 126 as feedstock 127 for extruder machine 120. The feedstock 127 is conveyed inside barrel 122 by screw shaft 124 and is heated by frictional forces inside barrel 122 and by heater 130. The feedstock 127 is extruded through barrel flange 128 and die flange 132 into upper die half 134 and lower die half 136. Fiber strand 142 feeds from reel 144 through feed port 138 into the upper die half 134. Similarly, fiber strand 146 feeds from reel 148 through feed port 140 into upper die half 134. Feedstock 127 is heated inside die halves 134 and 136 by heaters 133. Fiber strands 142 and 146 become imbedded in the feedstock 127 and are extruded from forming die 150 to create formed extrusion 152. Pressure sensor 137 senses the extrusion pressure near forming die 150 to allow control to be exerted over the rate of extrusion by controlling the rotational speed of screw shaft 124.

That is, pressure sensor 137 is positioned near forming die 150 so that extruder machine 120 can be operated to produce formed extrusion 152.

After leaving forming die 150, formed extrusion 152 enters sizing die 154. Sized extrusion 156 leaves sizing die 154 as an extrusion having a control shape. Sized extrusion 156 enters cooling chamber 158. Cooled extrusion 160 is pulled from cooling chamber 158 by pulling track 162 mounted on rollers 164 and pulling track 166 mounted on rollers 168. Tracks 162 and 166 also create pulling forces which act to pull formed extrusion 152 from forming die 150 and act to pull sized extrusion 156 from sizing die 154. Cooled extrusion 160 is cut to length by cutting device 170. The apparatus shown in FIG. 3 thus produces lengths of extruded material corresponding to the composite reinforcing structure 12 of FIG. 1 and corresponding to the insert 86 of FIG. 2.

FIG. 4 shows an enlarged view of a portion of the apparatus of FIG. 3. Feed port 140 is constructed in the same way as feed port 138. It should be understood that this invention can be practiced using a plurality of feed ports. The number of feed ports used would vary with the number of fiber strands to be embedded and the feed ports may be mounted in the upper die half 134 or the lower die half 136. Feed port 138 includes a sleeve 200 mounted in upper die half 134. Feed port member 138 is slidably mounted in sleeve 200. Feed port member 138 is split into at least two pieces, here shown as pieces 202 and 204. Feed port member 138 has a bore 206 passing longitudinally therethrough. Bore 206 is preferably shaped as a right cylindrical cone opening away from the upper die half 134. Fiber strand 142 passes through bore 206 and enters passage 210 between upper die half 134 and lower die half 136. When knots or other imperfections are encountered in fiber strand 142, feed port member 138 may be slidably pulled from sleeve 200 along the path shown by arrow 208 to allow such knots or imperfections in fiber strand 142 to pass through bore 206 by separating piece 202 from piece 204. When such knots or imperfections in fiber strand 142 have passed through bore 206 and entered passage 210, feed port member 138 may be pushed back in sleeve 200 in the direction shown by arrow 208. Thus feed port 138 allows for continuous production of formed extrusion 152 even when knots or imperfections exist in fiber strand 142.

A series of lobes 212, 214 and 216 are formed in uppe die half 134 and lower die half 136 such that passage 210 takes a convoluted route. The function of lobes 212, 214 and 216 is to cause fiber strands 142 and 146 to be passed over at least one lobe such that a thermoplastic resin material (not shown) inside passage 210 thoroughly contacts each of the fiber strands 142 and 146. By drawing the fiber strands 142 and 146 over the lobes 212, 214 and 216, thorough contact between a thermoplastic resin material and the fiber strands 142 and 146 is assured. Pressure sensor 137 measures the pressure of a thermoplastic resin material inside passage 210.

It is anticipated that various changes may be made in the shape, construction and operation of the invention as disclosed herein without departing from the spirit and scope of the invention as defined by the following claims.

What is claimed is:

1. A method of manufacturing a composite reinforcing structure comprising the steps of:
    extruding a mass of fluid thermoplastic resin material in a flowable state and having no discrete shape into and longitudinally through an elongated, stationary die having no relatively movable components, said die having a continuous, fully open central passage extending longitudinally therethrough, and a plurality of lobes projecting radially inwardly into said central passage from spaced apart locations along the length of the inside, opposite side walls of said central passage in interleaving relation to each other to form a convoluted passage through which said thermoplastic resin material flows;
    simultaneously introducing a plurality of continuous lengths of reinforcing fiber strands into said die central passage at different locations therein;
    separately passing each of said fiber strands longitudinally within and along the length of said central passage over and between said interleaving lobes in the presence of said flowing mass of thermoplastic material to thoroughly contact and coat each of said fiber strands with said thermoplastic material; and
    drawing said thermoplastic resin material and said coated fiber strands from said die, longitudinally thereof, to thereby produce a solid plastic rod member having said fiber strands extending longitudinally therein generally parallel to the longitudinal axis of said rod member inside of said plastic material.

2. The method of claim 1 further including a step of mixing a bonding additive with said thermoplastic resin material.

* * * * *